W. J. KNOX.
CINNAMIC ALDEHYDE OZONID.
APPLICATION FILED MAY 12, 1910.
1,086,373.
Patented Feb. 10, 1914.
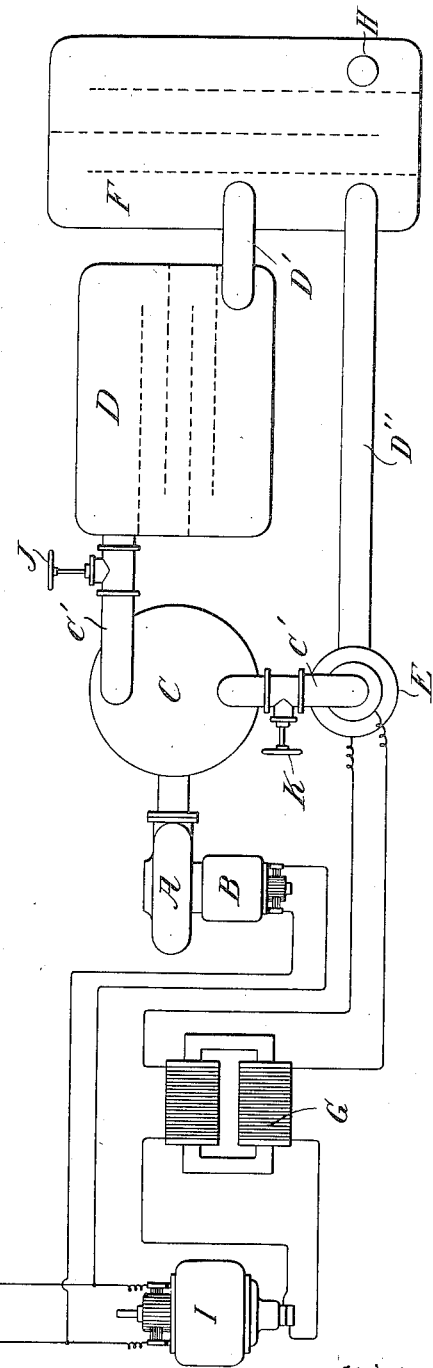

UNITED STATES PATENT OFFICE.

WILLIAM JOHN KNOX, OF NEW YORK, N. Y., ASSIGNOR, BY DIRECT AND MESNE ASSIGNMENTS, TO KNOX TERPEZONE COMPANY OF AMERICA, A CORPORATION OF WEST VIRGINIA.

CINNAMIC ALDEHYDE OZONID.

1,086,373.  Specification of Letters Patent.  Patented Feb. 10, 1914.

Application filed May 12, 1910. Serial No. 560,765.

*To all whom it may concern:*

Be it known that I, WILLIAM JOHN KNOX, a citizen of the United States, and a resident of New York city, borough of Manhattan, in the county of New York and State of New York, have invented new and useful Improvements in Cinnamic Aldehyde Ozonids; and I do declare the following to be a full, clear, and exact description of the invention, such as will enable others skilled in the art to which it appertains to make and use the same.

My invention relates to that class of chemical compounds known as ozonids, or compounds containing ozone in direct combination.

In a former application, Serial No. 560,764, filed May 12, 1910, I have described a new compound formed by the direct union of pinene in the form of vapor and ozone, the resulting compound being an ozonid composed of solid particles in suspension.

The object of this invention is a formation of an ozonid by combining ozone with an aldehyde in the form of vapor by simply intermingling with it ozone or ozonized air, and the further object of this invention is to produce a non-poisonous, non-irritating, highly germicidal vaporous substance.

The inventor has found that ozone will unite with cinnamic aldehyde directly forming an addition product. There is no by-product, no splitting up of either of the molecules taking part in the reaction; the two molecules unite wholly and directly. The reaction is,—

$$C_9H_8O + O_3 = C_9H_8O_4.$$

The exact structural formula has not been determined but the union of the ozone molecule with the aldehyde molecule undoubtedly takes place at the point of double bonding between the two CH groups. The structural formula of cinnamic aldehyde is,—

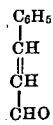

and the resulting oxidation product would be,—

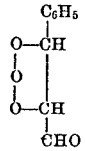

This is evident because the oxidation could not take place in the $C_6H_5$ group without the splitting off of hydrogen and the formation of water as a by-product of the reaction. The only vulnerable point, the only point where union can take place without any splitting up, is at the point of double bonding between the two CH groups. Ozone does not unite in this manner with other aldehydes in which this double bonding does not occur. The resulting compound is an opaque white vaporous substance which is made up of solid particles of almost molecular fineness in suspension. It does not condense or settle on surfaces even at very low temperatures and may be conveyed through pipes to long distances. When it emerges into free air it diffuses and assumes an invisible gaseous form without dissociation. It is a true ozonid in a vaporous form and possesses powerful oxidizing properties. It may properly be termed the ozonid of cinnamic aldehyde, or cinnamic aldehyde ozonid.

This ozonid is highly germicidal and this fact has been determined by the inventor by a series of bacteriological tests. The *Bacillus staphylococcus*, *B. Streptococcus*, and *B. Coli* are quickly killed when suspended in its vapor. Even when the vapor is highly diluted the bacilli are destroyed in less than one hour. It is of a pleasant aromatic odor and is non-poisonous and non-irritating to the mucous membranes. It can be inhaled in its concentrated form without irritation. These facts have been determined by tests extending over long periods of time.

The method I preferably employ in its manufacture or generation is in all respects similar to that described for the manufacture of "pinene ozonid" in my application No. 560,764, the apparatus being the same with cinnamic aldehyde substituted for the pinene.

In the diagrammatic drawing of the apparatus A is a fan blower for forcing air through the apparatus; B is an electric motor or other device for driving the fan; C is a vessel filled with lumps of fused calcium chlorid or slaked lime for extracting the moisture from the air; D is a vaporizing vessel for cinnamic aldehyde or cinnamon oil; E is an ozone generating device; and F is a diffusing or combining vessel for intermingling the cinnamic aldehyde vapor and the ozone; G is an electric transformer by means of which an ordinary low voltage alternating current is raised to voltage sufficiently high to operate the ozone generating device E. I find that from 8,000 to 10,000 volts are most suitable. In case the available electric current is of the direct type it is necessary to interpose in the line an electric converting machine I, such as a rotary converter or dynamotor to convert the direct current into the alternating.

In making cinnamic aldehyde ozonid, C is charged with fused calcium chlorid, and D is filled with sufficient cinnamine aldehyde to present a maximum evaporating surface. The valve J on the pipe C'', between C and D is closed, and valve K on the pipe between C and E is opened. The fan is now started and the high tension electric current switched into the ozone tube. This causes a current of dry air charged with ozone to pass through pipe O'' into the combining chamber E. The valve J may now be open gradually allowing the air to pass through the vaporizing chamber D. The area of the surface of cinnamon oil in D is so large that the air passing at all times will be fully saturated, and the quantity of cinnamic aldehyde vaporized will be in direct ratio to the air passing over its surface. The amount of air passing through the vaporizing chamber is gradually increased until the ozone is completely neutralized or combined with the aldehyde. This point can be determined exactly by testing the escaping cinnamic aldehyde ozonid by means of potassium iodid and starch for free ozone. From H the outlet of the combining chamber H the white vapor of the cinnamic aldehyde ozonid may be allowed to escape freely into the room or may be conducted to a distance.

Cinnamic aldehyde ozonid consists of molecularly fine solid particles that float freely in the air but it does not settle or deposit on a surface. It has a high vapor tension and assumes the form of a true gas without dissociation. It is capable of converting water into hydrogen peroxid and is highly germicidal and is pleasantly respirable.

I do not claim herein the process of producing gaseous ozonids broadly, having made such subject-matter the basis of a separate application filed by me December 2, 1911, Serial No. 663,602, and I also do not claim herein the apparatus for producing gaseous ozonids illustrated herein diagrammatically, having made the same the subject-matter of a separate application filed March 11, 1912, Serial No. 683,118.

Having thus fully set forth my invention, what I claim as new, and desire to secure by Letters Patent, is:—

1. The new substance cinnamic aldehyde ozonid having the formula $C_9H_8O_4$, composed of solid particles in suspension, and being white and opaque.

2. The method of making ozonid of cinnamic aldehyde which consists in generating ozone at one point, forming the vapor of cinnamic aldehyde at another point, and subsequently combining the ozone and cinnamic aldehyde vapor at a third point.

3. The making of ozonid of cinnamic aldehyde which consists in intermingling the vapor of cinnamon oil and ozone.

4. The process of producing cinnamic aldehyde ozonid which consists in commingling a vapor of cinnamic aldehyde, and ozone out of contact with the body of said cinnamic aldehyde.

In testimony whereof I have hereunto signed my name in the presence of two subscribing witnesses.

WILLIAM JOHN KNOX.

Witnesses:
M. E. McNINCH,
C. G. HEYLMAN.